(12) United States Patent
Lee et al.

(10) Patent No.: US 9,065,258 B2
(45) Date of Patent: Jun. 23, 2015

(54) SWITCH FOR SOLID INSULATED SWITCHGEAR

(71) Applicant: LSIS CO., LTD., Anyang-si, Gyeonggi-do (KR)

(72) Inventors: Jae Gul Lee, Anseong-si (KR); Sang Hyub Yoon, Cheongju-si (KR); Dong Hwan Jung, Sejong-si (KR); Young Kim, Cheongju-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 317 days.

(21) Appl. No.: 13/851,012

(22) Filed: Mar. 26, 2013

(65) Prior Publication Data

US 2013/0258556 A1      Oct. 3, 2013

(30) Foreign Application Priority Data

Apr. 3, 2012   (KR) ................. 10-2012-0034616

(51) Int. Cl.
H02B 13/00 (2006.01)
H01H 33/666 (2006.01)
(Continued)

(52) U.S. Cl.
CPC .............. H02B 13/00 (2013.01); H01H 31/003 (2013.01); H01H 33/6661 (2013.01); H01H 2033/6623 (2013.01)

(58) Field of Classification Search
CPC . G06F 1/181–1/182; H05K 7/20218–7/20381; H05K 7/20409–7/20418; H05K 1/0272; H01L 23/367–23/3677; H01L 23/473; F28F 3/02; F28F 13/06–13/125; F04D 29/58; F04D 29/5806; F04D 29/5813; F24F 13/08; H04B 1/036; H04Q 2201/06; H01H 9/52–9/526; H01H 1/62; H02B 13/00–13/025

USPC ................ 361/676–678, 679.46–679.54, 361/688–723, 604–605; 165/80.1–80.5, 165/104.33, 185; 174/15.1–15.3, 174/16.1–16.3, 547, 548; 257/712–722, 257/E23.088

See application file for complete search history.

(56) References Cited

U.S. PATENT DOCUMENTS 5,864,107 A * 1/1999 French et al. .............. 200/50.01
6,040,538 A * 3/2000 French et al. ................ 200/293
(Continued)

FOREIGN PATENT DOCUMENTS

CN        85105582     12/1986
CN        1653663      8/2005
KR        10-1033536   5/2011

OTHER PUBLICATIONS

Korean Intellectual Property Office Application U.S. Appl. No. 10-2012-0034616, Office Action dated Mar. 28, 2013, 3 pages.
(Continued)

*Primary Examiner* — Anthony Haughton
*Assistant Examiner* — Razmeen Gafur
(74) *Attorney, Agent, or Firm* — Lee, Hong, Degerman, Kang & Waimey

(57) ABSTRACT

A switch according to the invention comprises a enclosure that is solid insulated and includes an electric power source side bushing portion, an electric load side bushing portion, and an accommodation body portion having air filled therein; a main circuit switch installed, for each pole, and having a vacuum interrupter that switches an electric power circuit by receiving a switching driving force from a common actuator; and an earth switch installed including a first fixed contactor to be earthed; a second fixed contactor electrically connected to the electric power source side connection conductor; and a movable blade connected to the common actuator, and movable to a first position for contacting the first fixed contactor and to a second position for contacting the second fixed contactor, by the switching driving force from the common actuator.

10 Claims, 9 Drawing Sheets

(51) Int. Cl.
　　　*H02B 13/025*　　　(2006.01)
　　　*H01H 31/00*　　　(2006.01)
　　　*H01H 33/662*　　　(2006.01)

(56) References Cited

U.S. PATENT DOCUMENTS

| | | | |
|---|---|---|---|
| 6,442,452 B1* | 8/2002 | Kopke | 700/292 |
| 6,878,891 B1* | 4/2005 | Josten et al. | 200/293 |
| 7,486,499 B2* | 2/2009 | Rambo et al. | 361/609 |
| 2001/0005306 A1* | 6/2001 | Arioka et al. | 361/611 |
| 2001/0009199 A1* | 7/2001 | Arioka et al. | 174/142 |
| 2002/0054474 A1* | 5/2002 | Koga et al. | 361/605 |
| 2002/0122288 A1* | 9/2002 | Kashima et al. | 361/605 |
| 2003/0141281 A1* | 7/2003 | Okabe et al. | 218/7 |
| 2004/0042158 A1* | 3/2004 | Otsuka et al. | 361/605 |
| 2004/0130858 A1* | 7/2004 | Lammers | 361/605 |
| 2008/0007896 A1* | 1/2008 | Tsuchiya et al. | 361/612 |
| 2008/0081516 A1* | 4/2008 | Brandt et al. | 439/638 |
| 2008/0259532 A1* | 10/2008 | Hughes et al. | 361/611 |
| 2010/0002363 A1* | 1/2010 | Kurogi et al. | 361/606 |
| 2010/0046146 A1* | 2/2010 | Christensen et al. | 361/605 |
| 2010/0091434 A1* | 4/2010 | Pereira et al. | 361/677 |
| 2010/0290175 A1* | 11/2010 | Jacobsen et al. | 361/605 |
| 2011/0149478 A1* | 6/2011 | Shea et al. | 361/601 |
| 2011/0149482 A1* | 6/2011 | Shea et al. | 361/624 |
| 2012/0013227 A1* | 1/2012 | Josten et al. | 312/109 |
| 2012/0024506 A1* | 2/2012 | Yano et al. | 165/135 |
| 2012/0044616 A1* | 2/2012 | Takahashi et al. | 361/611 |
| 2012/0097413 A1* | 4/2012 | Bugaris et al. | 174/50 |

OTHER PUBLICATIONS

The State Intellectual Property Office of the People's Republic of China Serial Number 201310116370.7, Office Action dated Feb. 27, 2015, 8 pages.

* cited by examiner

SWITCH FOR SOLID INSULATED SWITCHGEAR

CROSS-REFERENCE TO RELATED APPLICATION

Pursuant to 35 U.S.C. §119(a), this application claims the benefit of earlier filing date and right of priority to Korean Application No. 10-2012-0034616, filed on Apr. 3, 2012, the contents of which is incorporated by reference herein in its entirety.

BACKGROUND OF THE INVENTION

1. Field of the Invention

The present disclosure relates to a solid insulated switchgear, and particularly, to a switch for a solid insulated switchgear (so-called 'arc extinguishing unit) having an earth switch, and capable of performing a high insulating performance in an earth opening state in ordinary times.

2. Background of the Invention

The present invention relates to a switchgear capable of performing operations to divide electric lines and to break an electric load in an underground electric power distribution system using a high voltage of several tens of kilo bolts, among electric power transmission and distribution systems.

As such switchgear called 'multi circuit load break switch', has been mainly used a gas insulated switchgear having therein a plurality of switches in a tank where arc extinguishing gas formed of sulphur hexafluoride ($SF_6$) has been filled.

However, such gas insulated switchgear is being replaced by a solid insulated switchgear using a solid insulated switch, due to a problem that gas pressure should be maintained, a problem that sulphur hexafluoride ($SF_6$) should be used, the $SF_6$ known as gas causing the global warming and restricted in use in the world, and so on.

The configuration and the operation of the solid insulated switchgear have been disclosed in Korean Patent Registration No. 10-0832331 (title of the invention is "Power transmission apparatus for high voltage load break switch") filed and owned by the present applicant.

In the conventional art of Korean Patent Registration No. 10-0832331, both a main circuit switch and an earth switch are configured as a vacuum interrupter.

However, the conventional art where a vacuum interrupter is used as an earth switch, the distance between a movable contact and a fixed contact is about 10 millimeters on the earth switch which is in an open state in ordinary times, due to characteristics of the vacuum interrupter. Such short insulation distance between the contacts, may cause a ground fault by insulation breakdown due to the occurrence of sparks, etc. in ordinary times where the earth switch is in an open state, in a switchgear of an underground distribution system used in a power circuit having a very high voltage of several tens of kilo bolts.

In order to protect an operator or a manager of the solid insulated switchgear which can contact an enclosure of an arc extinguishing unit (i.e., switch enclosure) from an electric accident such as an electric shock, has been disclosed a technique where a semi-conductive layer is formed at the switch enclosure so as to be earthed.

FIG. 3 shows a configuration that a semi-conductive coating layer (SCC) is coated on the entire part of an enclosure of an arc extinguishing unit 20, i.e., a switch enclosure in accordance with the conventional art.

However, such configuration has the following problems.

If the semi-conductive coating layer (abbreviated as SCC) is coated on the entire part of the switch enclosure, as shown in FIG. 5 or 7, an electric field may be concentrated between a conductive path and an earth terminal inside the arc extinguishing unit under the state that a ground is opened and an electric current flows through the main circuit.

In order to reduce such concentration of an electric field, a space distance and a surface distance between the conductive path and the earth terminal should be increased. This may result in increase of the size of the switch, i.e., the arc extinguishing unit. This may cause a difficulty in miniaturizing the switchgear.

SUMMARY OF THE INVENTION

Therefore, an aspect of this disclosure is to provide a switch for a solid insulated switchgear, the switch having a main circuit switch and an earth switch, and capable of obtaining a sufficient switching insulation distance of the earth switch, so as to minimize the occurrence of a ground fault at the earth switch.

Another aspect of the this disclosure is to provide an arc extinguishing unit for a solid insulated switchgear, capable of obtaining a sufficient switching insulation distance of an earth switch, so as to minimize the occurrence of a ground fault at the earth switch.

Still another aspect of the this disclosure is to provide a switch for a solid insulated switchgear, or an arc extinguishing unit for a solid insulated switchgear, capable of reducing an electric field from being concentrated between the conductive path and the earth terminal in an enclosure, under the state that a ground is opened and an electric current flows through the main circuit, and capable of having no need to increase the size of an arc extinguishing unit.

To achieve these and other advantages and in accordance with the purpose of this disclosure, as embodied and broadly described herein, there is provided a switch for a solid insulated switchgear having a common actuator that provides a driving force for switching a circuit, the switch comprising:

an enclosure that is solid insulated and includes an electric power source side bushing portion for burying an electric power source side connection conductor, an electric load side bushing portion for burying an electric load side connection conductor, and an accommodation body portion having air filled therein;

a main circuit switch installed, for each pole, at the enclosure, connected to the common actuator and the electric power source side connection conductor, and having a vacuum interrupter that switches an electric power circuit between an electric power source and an electric load, by receiving a switching driving force from the common actuator; and an earth switch installed, for each pole, in the accommodation body portion of the enclosure so as to be air-insulated, and the earth switch including a first fixed contactor to be earthed; a second fixed contactor electrically connected to the electric power source side connection conductor; and a movable blade connected to the common actuator, and movable to a first position for contacting the first fixed contactor and to a second position for contacting the second fixed contactor, by a switching driving force from the common actuator.

To achieve these and other advantages and in accordance with the purpose of this disclosure, as embodied and broadly described herein, there is also provided an arc extinguishing unit for a solid insulated switchgear, comprising:

an enclosure that is solid insulated and includes an electric power source side bushing portion for burying an electric power source side connection conductor, an electric load side bushing portion for burying an electric load side connection conductor, and an accommodation body portion having air filled therein;

a main circuit switch installed, for each pole, at the enclosure, and having a vacuum interrupter that switches an electric power circuit between an electric power source and an electric load; and an earth switch installed, for each pole, in the accommodation body portion of the enclosure so as to be air-insulated, and the earth switch including a first fixed contactor to be earthed; a second fixed contactor electrically connected to the electric power source side connection conductor; and a movable blade movable to a first position for contacting the first fixed contactor and to a second position for contacting the second fixed contactor.

To achieve these and other advantages and in accordance with the purpose of this disclosure, as embodied and broadly described herein, there is still also provided a switch for a solid insulated switchgear, or an arc extinguishing unit for a solid insulated switchgear, further comprising a semi-conductive coating layer coated on only one of a first external part of the enclosure where the first fixed contactor is installed, and a second external part of the enclosure where the movable blade on the second position is located, and the semi-conductive coating layer formed to be earthed.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this disclosure, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

A configuration of a solid insulated switchgear including a switch according to the present invention will be explained with reference to FIGS. 1 and 2.

Figure 1:
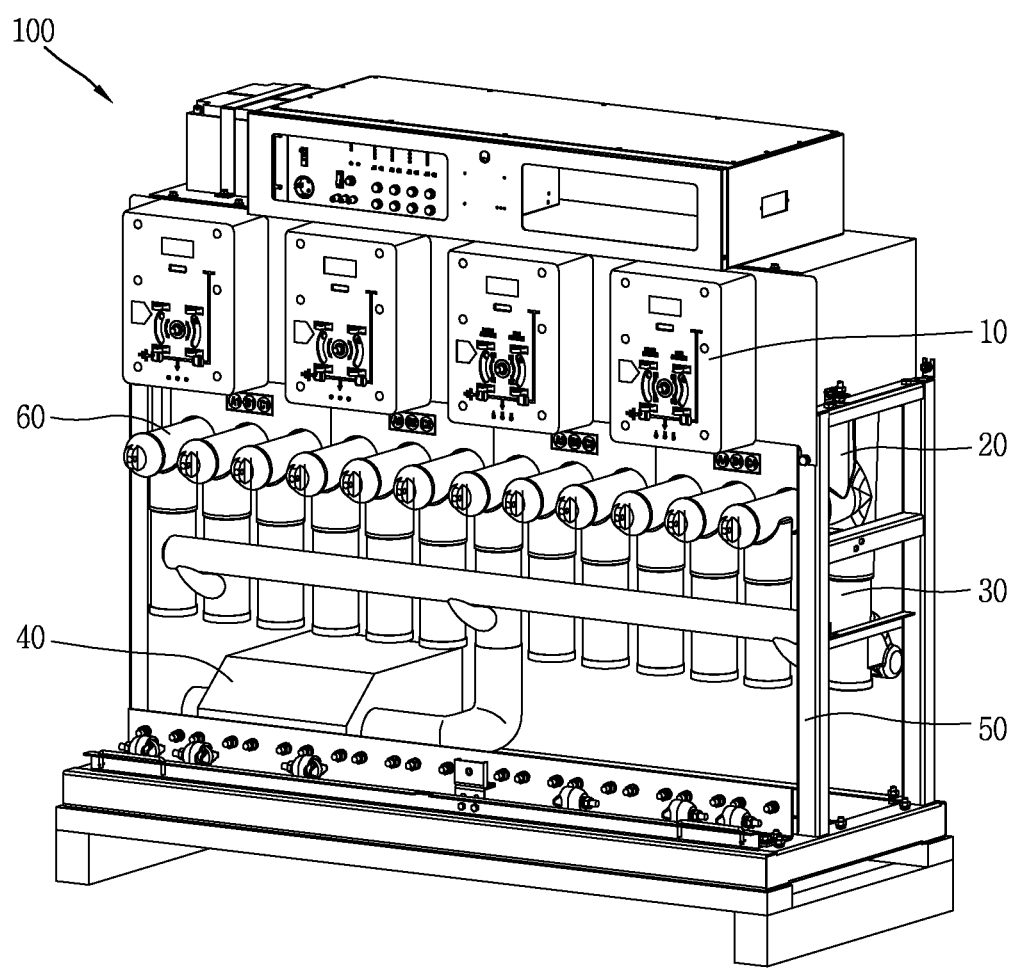
FIG. 1 is a perspective view showing the appearance of a solid insulated switchgear where a switch of the present invention is installed.

Referring to FIG. 1, the solid insulated switchgear 100 largely includes a common actuator 10, an arc extinguishing unit 20, a phase connector 30 for phase (pole) connection, a potential transformer 40, and a supporting frame 50. Reference numeral 60 of FIG. 1 designates an elbow connector.

Figure 2:
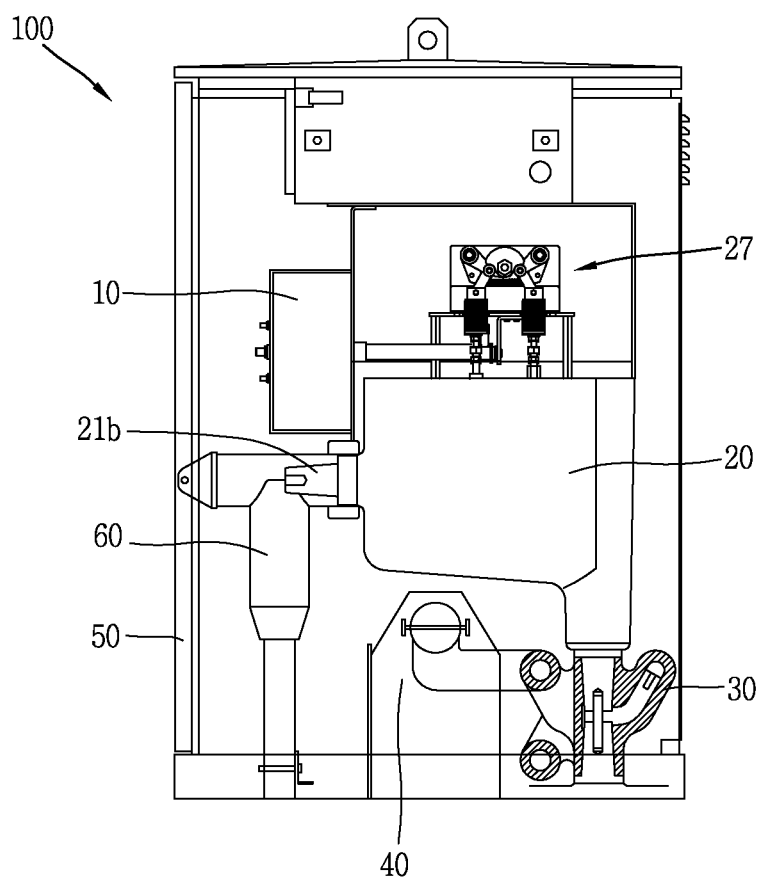
FIG. 2 is a longitudinal sectional view showing the internal configuration of a solid insulated switchgear where a switch of the present invention is installed.
Figure 3:
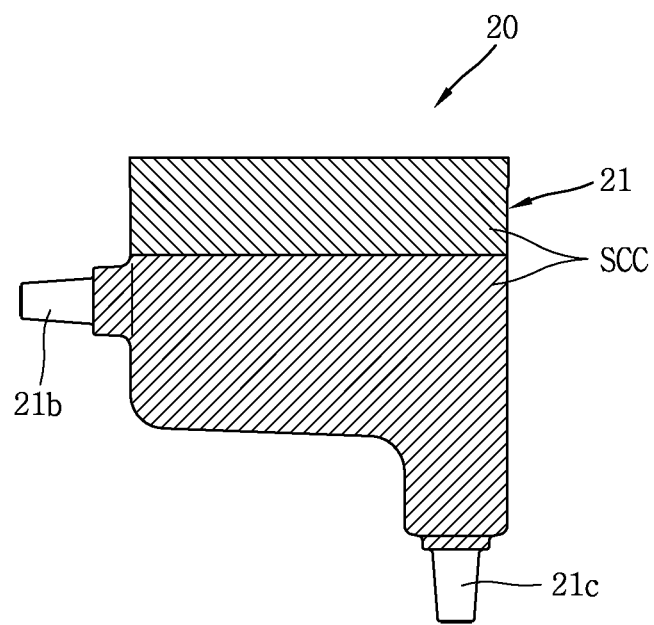
FIG. 3 is a front view showing a configuration of a semi-conductive coating layer of an enclosure, in an arc extinguishing unit of a solid insulated switchgear in accordance with the conventional art.

Reference numeral 21*b* of FIG. 2 designates an electric load side bushing of a switch enclosure formed of a solid insulating material and included in the arc extinguishing unit 20. Reference numeral 27 designates a power transmission link mechanism. And, reference numeral 60 designates an elbow connector, a means to connect an electric load side power line to the electric load side bushing 21*b*. Here, the elbow connector 60 configured as a conductor for electrical connection is buried in an external surface of an electrical insulator. The conductor inside the elbow connector 60 is electrically and mechanically connected to an electric load side connection conductor (refer to 25 of FIG. 4) buried in the electric load side bushing 21*b*, the electric load side connection conductor to be later explained.

The common actuator 10 is a means to provide a switching driving force for switching a circuit to a main circuit switch and an earth switch to be later explained, by being commonly connected to the main circuit switch and the earth switch. The common actuator 10 includes a motor driving source such as a motor and a hydraulic cylinder, or a manual driving source by a user's manual power, and an actuator mechanism configured to convert power from the driving source into a switching driving force for switching a circuit of a switch. The configuration and operation thereof have been disclosed in Korean Patent Registration No. 10-0186357 registered by the present applicant (a title of the invention is "Automatic contact actuator for 3-position multi switch"), and thus detailed explanations thereof will be omitted.

Figure 4:
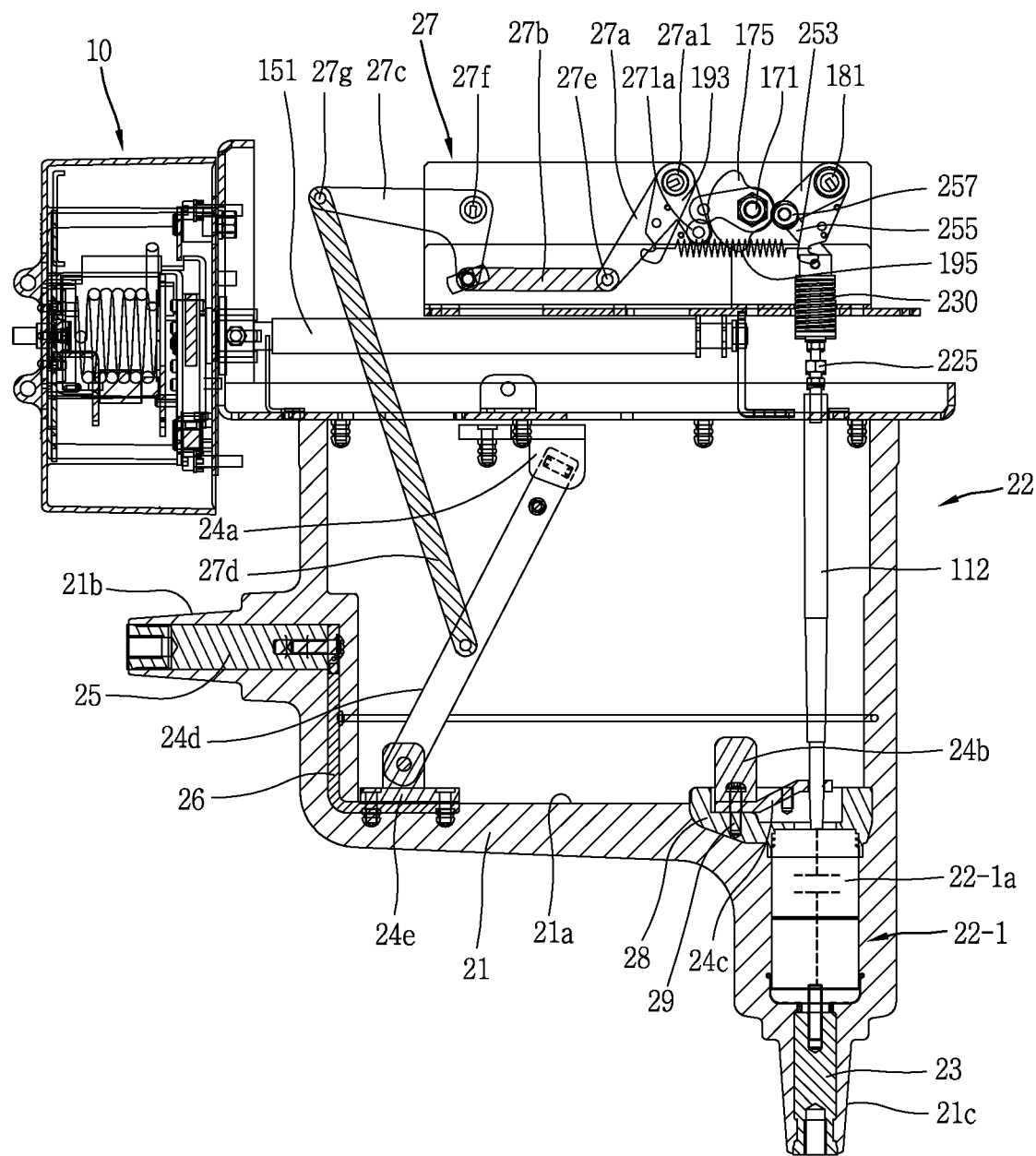
FIG. 4 is a longitudinal sectional view showing an earth closing state, which shows configurations and operation states of an arc extinguishing unit and a power transmission link mechanism according to a preferred embodiment of the present invention.

As shown in FIG. 4, the common actuator 10 may further include a first power transmission mechanism such a main shaft 151, a cam shaft 171 and a cam 175, the mechanism configured to transmit power from the driving source to the main circuit switch and the earth switch.

The main shaft 151 is rotatable clockwise or counterclockwise according to an opening position or closing position of a circuit, as one end thereof is connected to an output shaft of the common actuator 10. A lever (not shown) is connected to another end of the main shaft 151, thereby rotating in the same direction as the main shaft 151. A connecting rod (not shown) is connected to the lever, thereby moving up and down according to rotation of the lever.

The cam shaft 171 is connected to the connecting rod as another lever (not shown) is interposed therebetween, and rotates clockwise or counterclockwise according to up-down movement of the connecting rod.

The cam 175 is a member installed at the cam shaft 171, and rotatable in the same direction as the cam shaft 171 when the cam shaft 171 rotates. The cam 175 has part having a large curvature radius, and part having a small curvature radius.

The configuration and the operation of the first power transmission mechanism have been disclosed in Korean Patent Registration No. 10-0832331 registered by the present applicant (a title of the invention is "Power transmission mechanism for high voltage load break switch"), and thus detailed explanations thereof will be omitted.

The configuration and the operation of the arc extinguishing unit 20 will be explained later with reference to FIGS. 4 to 7. The arc extinguishing unit 20 according to a preferred embodiment of the invention may be provided in three for a 3-phases (3-poles) alternating current (AC) circuit. A single solid insulated switchgear 100 for 4 branch circuits (divided circuits) may be provided with a total number of 12, in which 3 arc extinguishing unites 20 are provided in each branch circuit.

The phase connector 30 in FIG. 1 or FIG. 2 is a conductor connector for electrically connecting the main circuit switches and the earth switches of the same phase (pole) to one another, in the arc extinguishing units 20 for the branch circuits. The phase connector 30 is provided in three for 3-phase (3-pole), and extends in a lengthwise direction of the solid insulated switchgear 100. And, the phase connector 30 is electrically and mechanically connected to a lower part of the arc extinguishing unit 20. The configuration and the operation of the phase connector 30 have been disclosed in Korean Patent Registration No. 10-0789446 registered by the present applicant (a title of the invention is "Electrical connecting apparatus for a plurality of solid insulated load break switches"), and thus detailed explanations thereof will be omitted.

The potential transformer 40 is electrically connected to one of the phase connectors 30, and is configured to supply an electric power to a controller (not shown) installed at the uppermost part of the solid insulated switchgear 100 by transforming voltage of the phase connector 30. The connecting configuration and the operation of the potential transformer 40 have been disclosed in Korean Patent Registration No. 10-0928933 registered by the present applicant (a title of the invention is "Solid insulated load break switch and potential transformer connecting apparatus for the same"), and thus detailed explanations thereof will be omitted.

The supporting frame 50 is a means to support components of the solid insulated switchgear 100, which may configured by a plurality of horizontal frames and vertical frames.

The configuration of the switch for a solid insulated switchgear according to the present invention will be explained with reference to FIGS. 4 to 7.

Figure 6:
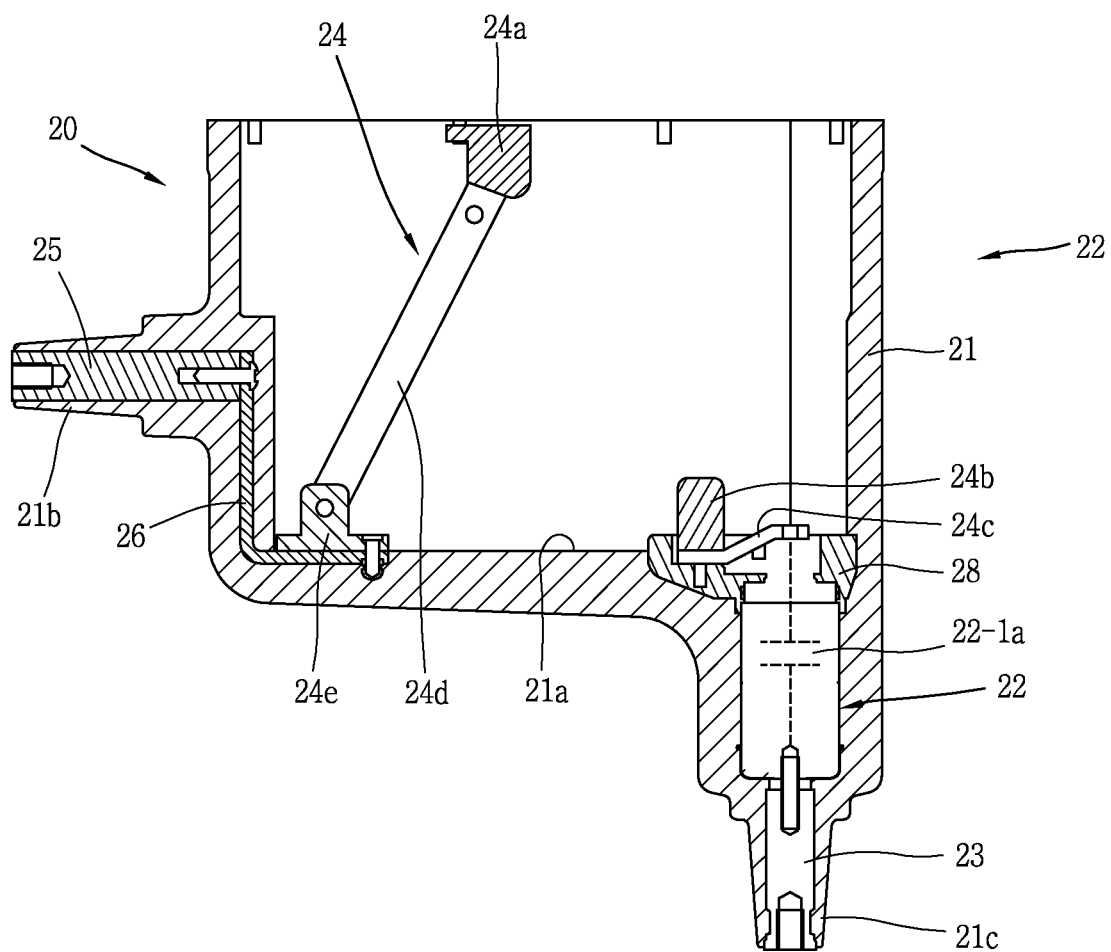
FIG. 6 is a longitudinal sectional view showing an earth closing state, which shows a configuration and an operation state of an arc extinguishing unit according to a preferred embodiment of the present invention.
Figure 7:
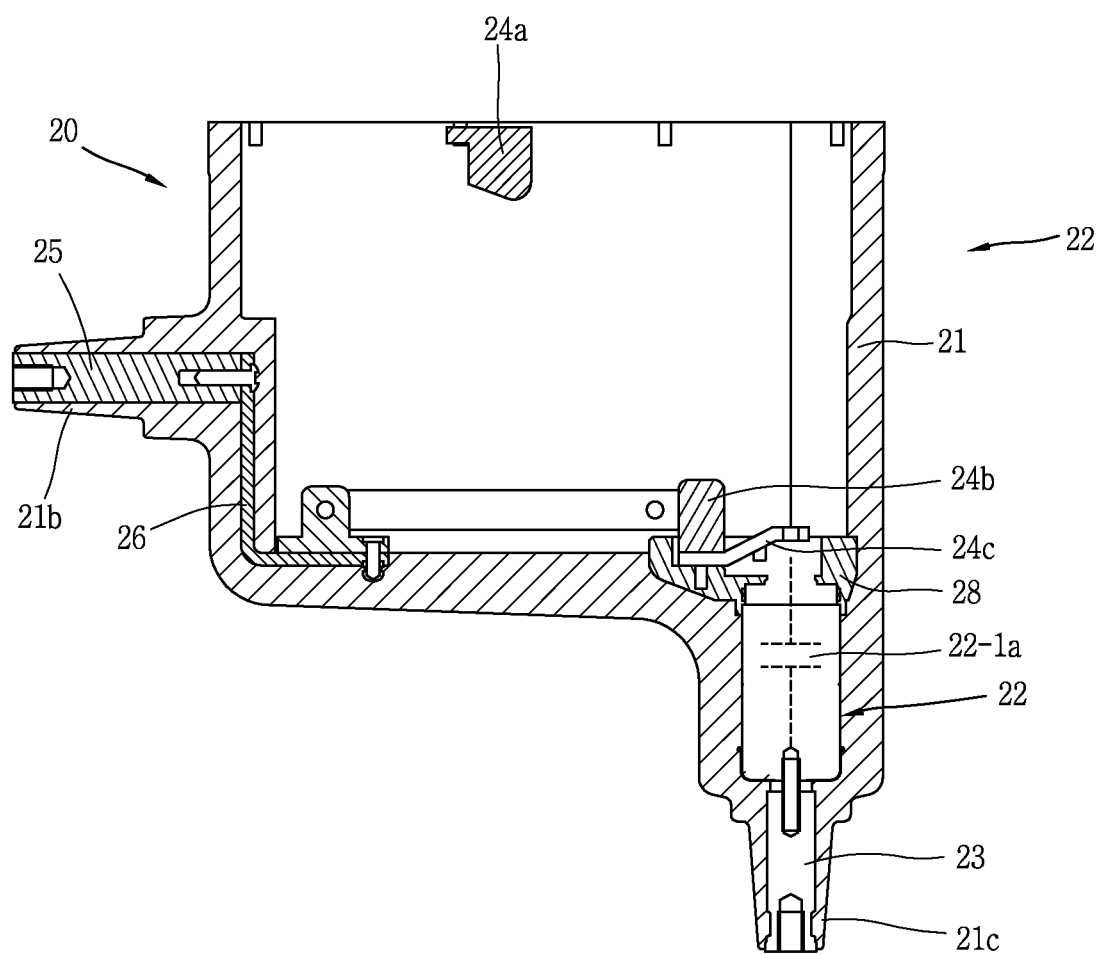
FIG. 7 is a longitudinal sectional view showing an earth opening state, which shows a configuration and an operation state of an arc extinguishing unit according to a preferred embodiment of the present invention.

As shown in FIG. 6, the arc extinguishing unit 20, the switch of the present invention includes a switch enclosure 21, a main circuit switch 22, and an earth switch 24.

The switch enclosure 21 is formed of a solid insulating material such as epoxy, and has an approximate rectangular parallelepiped shape. The switch enclosure 21 is provided with an accommodation portion 21a filled with air and providing a space where the components of the arc extinguishing unit 20 are installed; an electric load side bushing portion 21b having a conical protrusion on a front portion of the switch enclosure 21; and an electric power source side bushing portion 21c having a conical protrusion on a rear and lower portion of the switch enclosure 21. The switch enclosure 21 for 3-phases AC circuits may be provided in 12 in number, in the single solid insulated switchgear 100 for 4 branch circuits according to a preferred embodiment of the invention.

The switch enclosure 21 has a semi-conductive coating layer on an external surface thereof, and the semi-conductive coating layer is earthed. The configuration of the semi-conductive coating layer will be later explained in more detail with reference to FIGS. 8 to 10.

A electric power source side connection conductor 23 and a vacuum interrupter 22-1 are buried in the electric power source side bushing portion 21c.

A electric load side connection conductor 25 is buried in the electric load side busing portion 21b.

The main circuit switch 22 is installed in the switch enclosure 21, which is formed correspondingly for each of 3-phases of each branch circuit.

The main circuit switch 22 is connected to the common actuator 10 and the electric power source side connection conductor 23. And, the main circuit switch 22 has a vacuum interrupter 22-1 for switching an electric power circuit between an electric power source and an electric load, by receiving a switching driving force from the common actuator 10.

More specifically, the main circuit switch 22 includes the vacuum interrupter 22-1 as a main component. For a driving force for driving a movable contact to a closing position or an opening position in a contact portion 22-1a inside the vacuum interrupter 22-1, the main circuit switch 22 further includes a second power transmission mechanism connected to the first power transmission mechanism of the common actuator 10.

As well-known, the vacuum interrupter 22-1 is a core component of the main circuit switch 22, and is capable of rapidly extinguishing an arc generated when opening or closing (switching) a circuit of a high voltage, by installing a movable contact and a fixed contact in a vacuum container as the contact portion 22-1a.

As shown in FIG. 4, the second power transmission mechanism of the main circuit switch 22 includes a roller 257, a first link 253, a second link 255, a first operation shaft 181, a contact-press spring 230, a connecting rod 225 and a switching rod 112.

The roller 257 is rotatably installed on an outer circumferential surface of a connection pin which connects the first link 253 and the second link 255 to each other. And, the roller 257 provides a driving force for rotating the first link 253 and the second link 255 by contacting an outer circumferential surface of the cam 175, and thus by being pressed by the rotating cam 175.

The first link 253 and the second link 255 are means to convert a rotation force from the cam 175 into an up-down driving force, thus to provide the driving force. Referring to FIG. 4, if the cam 175 clockwise rotates, the first link 253 counterclockwise rotates while the second link 255 clockwise rotates, by the roller 257 contact-pressed by part of the cam 175 having a large curvature radius. As the second link 255 clockwise rotates, a displacement of down going occurs in vertical direction.

An upper end of the first link 253 is rotatably supported by the first operation shaft 181, and a lower end thereof is connected to the second link 255 by the connection pin.

An upper end of the second link 255 is connected to the first link 253 by the connection pin, and a lower end thereof is connected, by the connection pin, to a contact-press spring supporting rod (not shown) which supports the contact-press spring 230.

The first operation shaft 181 rotatably supports the first link 253.

The contact-press spring 230 is installed around the contact-press spring supporting rod (not shown).

The contact-press spring 230 downward provides an elastic force to the connecting rod 225 connected to a lower part of the contact-press spring supporting rod (not shown), and the switching rod 112 connected to a lower end of the connecting rod 225, respectively. As a result, a contact pressure between the movable contact and the fixed contact of the vacuum interrupter 22-1 connected to the switching rod 112, is increased on a closing position where the movable contactor contacts the fixed contact.

The connecting rod 225 is a bar-shaped member connected between the contact-press spring supporting rod (not shown) and the switching rod 112.

An upper end of the switching rod 112 is connected to the connecting rod 225, and a lower end thereof is connected to the movable contact among the contact portion 22-1a of the vacuum interrupter 22-1. Under such configuration, the switching rod 112 moves up-down so that an up-down driving force from the connecting rod 225 can be transmitted to the movable contact.

The configuration of the earth switch of the switch for a solid insulated switchgear will be explained with reference to FIGS. 4 to 7.

As shown in FIG. 6, the earth switch 24 of the switch for a solid insulated switchgear is provided for each of three phases, so three earth switches 24 are provided for each branch circuit. And, the earth switch 24 is installed so as to be air-insulated in the accommodation body portion 21a of the switch enclosure 21.

The earth switch 24 includes a first fixed contactor 24a, a second fixed contactor 24b and a movable blade 24d.

The first fixed contactor 24a is fixed to an upper part of the accommodation body portion 21a, by a fixing means such as a fixing screw, and is earthed.

More specifically, as shown in FIG. 4, the first fixed contactor 24a is fixed, by a fixing means such as a fixing screw (bolt), to an intermediate horizontal frame of the supporting frame 50 for supporting the switch enclosure 21, the intermediate horizontal frame formed of conductive metal such as steel. As shown in FIG. 1, the first fixed contactor 24a may be earthed through horizontal and vertical frames connected to the intermediate horizontal frame, and earth lines (not shown).

As shown in FIG. 4, the first fixed contactor 24a may include a pair of contactor portions facing each other with a predetermined distance to contact the movable blade 24d by inserting therebetween, and a supporting base portion for supporting the contactor portions and providing a fixing surface to fix the first fixed contactor 24a to the intermediate horizontal frame of the supporting frame 50.

As shown in FIG. 4, like the first fixed contactor 24a, the second fixed contactor 24b may include a pair of contactor portions facing each other with a predetermined distance to contact the movable blade 24d by inserting therebetween.

As shown in FIG. 4, the second fixed contactor 24b is fixed, by a fixing bolt 29, to a supporting base 28 buried in an inner bottom surface of the accommodation body portion 21a, together with one end of a flexible connector 24c.

Another end of the flexible connector 24c is connected to the switching rod 112, so as to surround with contacting a lower outer circumferential surface of the switching rod 112, thereby being movable up and down along the switching rod which moves up and down.

The second fixed contactor 24b may be electrically connected to the electric power source side connection conductor 23, through the flexible connector 24c, the switching rod 112 and the vacuum interrupter 22-1.

The movable blade 24d is connected to the common actuator 10, and is movable to a first position for contacting the first fixed contactor 24a and to a second position for contacting the second fixed contactor 24b, by a switching driving force from the common actuator 10.

One end of the movable blade 24d is rotatably supported by a conductive hinge base 24e fixed to one side of the inner bottom surface of the accommodation body portion 21a. An intermediate part of the movable blade 24d in a lengthwise direction is connected, by a connection pin (not shown), to a second link 27d of a power transmission link mechanism 27 to be later explained. Another end of the movable blade 24d serving as a free end, may have contact portions protruding from two plate surfaces of the movable blade 24d.

The earth switch 24 of the switch for a solid insulated switchgear according to the present invention may further include a power transmission link mechanism 27 connected between the movable blade 24d and the common actuator 10, and having a plurality of links for transmitting a switching driving force from the common actuator 10 to the movable blade 24d.

As shown in FIG. 4, the power transmission link mechanism 27 includes a first lever 27a, a first link 27b, a second lever 27c and a second link 27d.

The first lever 27a is contactable to the common actuator 10, and is rotatable centering around the first rotation shaft 27a1. One end of the first lever 27a is provided with a roller 271a, so as to softly contact the cam 175 of the common actuator 10 without any impact. The first lever 27a is an 'L'-shaped plate lever, and has a long part and a short part. The roller 271a is rotatably installed at the end of the short part, and the end of the long part is connected to the first link 27b by a first connection pin 27e.

The first link 27b has one end connected to the first lever 27a, and is movable back and forth according to rotation of the first lever 27a. Another end of the first link 27b is connected to the second lever 27c by a connection pin.

The second lever 27c has one end connected to another end of the first link 27b, and is rotatable centering around a second rotation shaft 27f. The second lever 27c is an 'L'-shaped bar-shaped member, and has a long part and a short part. The second rotation shaft 27f is provided to penetrate an intermediate part between the long part and the short part, thereby rotatably supporting the second lever 27c. The end of the short part of the second lever 27c as said one end is connected to the first link 27b.

The second link 27d is a long bar-shaped member, and has one end connected to the second lever 27c and another end connected to the movable blade 24d. The second link 27d is movable up and down according to rotation of the second lever 27c. That is, if the second lever 27c clockwise rotates, the second link 27d upward moves. On the other hand, if the second lever 27c counterclockwise rotates, the second link 27d downward moves.

If the second link 27d upward moves, the movable blade 24d of which intermediate part has been connected to another end of the second link 27d, counterclockwise rotates centering around the conductive hinge base 24e. On the other hand, if the second link 27d downward moves, the movable blade 24d of which intermediate part has been connected to another end of the second link 27d, clockwise rotates centering around the conductive hinge base 24e.

The switch enclosure 21, the main circuit switch 22 and the earth switch 24 are provided in three for each pole of three phases (in other words three poles) AC (Alternating Current), thereby configuring a single circuit switch.

The solid insulated switchgear may comprise four circuit switches according to a preferred embodiment of the present invention.

The operation of the switch for the solid insulated switchgear according to the present invention will be explained.

Firstly, a closing operation ('ON' operation) of the main circuit switch 22 of the switch for a solid insulated switchgear according to an embodiment of the present invention, will be explained with reference to FIGS. 4 and 5.

If the main shaft 151 clockwise rotates by a closing driving force from the common actuator 10, a connecting rod (not shown) upward moves, the connecting rod of which lower end has been connected to an output end of the main shaft 151 (refer to the right end in FIG. 4). The cam shaft 171 connected to an upper end of the connecting rod clockwise rotates from the position of FIG. 5, by a predetermined angle (e.g., 90°).

Then, the roller 257 contact-pressed by a large radius part of the cam 175 moves to the right from the position of FIG. 4, as the cam 175 installed at the cam shaft 171 clockwise rotates by 90°. Therefore, the second link 255 downward moves by a predetermined distance.

The first link 253, the first operation shaft 181, and a supporting lever of a trip spring 195 supported by the first operation shaft 181 rotate counterclockwise, and thus the trip spring 195 extends to charge elastic energy.

The switching rod 112 connected to the second link 255 through the connecting rod 225, downward moves by a predetermined distance. As the movable contact of the contact portion 22-1a inside the vacuum interrupter 22-1 connected to a lower end of the switching rod 112 contacts the fixed contact, the vacuum interrupter 22-1 is in a closed state.

The operation of the earth switch 24 will be explained.

Figure 5:
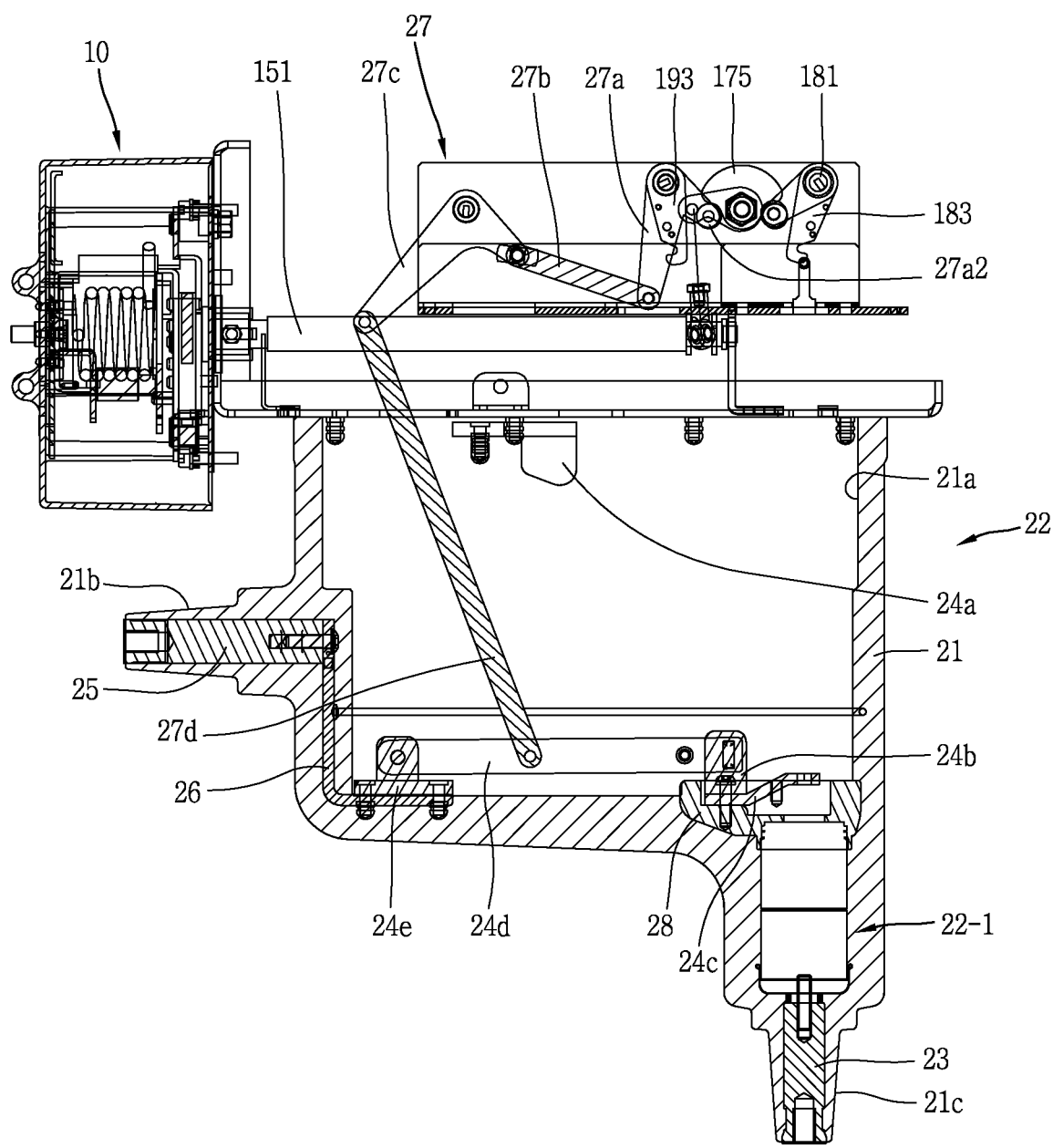
FIG. 5 is a longitudinal sectional view showing an earth opening state, which shows configurations and operation states of an arc extinguishing unit and a power transmission link mechanism according to a preferred embodiment of the present invention.

The first lever 27a of the power transmission link mechanism 27 of the earth switch 24 contacts a small radius part (outer circumferential surface having a small radius) of the cam 175, the first lever 27a does not rotate to maintain a state of FIG. 5.

Accordingly, other parts of the power transmission link mechanism 27 maintain the state of FIG. 5, and the movable blade 24d is in a contacted state to the second fixed contactor 24b as shown in FIG. 5.

Accordingly, current from an electric power source side flows to an electric load side, via the electric power source side connection conductor 23, the contact portion 22-1a of the vacuum interrupter 22-1, the switching rod 112, the flexible connector 24c, the second fixed contactor 24b, the movable blade 24d, the conductive hinge base 24e, the conductor connector 26 and the electric load side connection conductor 25.

Hereinafter, an opening operation ('OFF' operation or breaking operation) of the main circuit switch 22 of the switch for a solid insulated switchgear according to an embodiment of the present invention, will be explained with reference to FIGS. 4 and 5.

If the main shaft 151 counterclockwise rotates by an opening driving force from the common actuator 10, a connecting rod (not shown) downward moves, the connecting rod of which lower end has been connected to the output end of the main shaft 151 (refer to the right end in FIG. 4). The cam shaft 171 connected to an upper end of the connecting rod counterclockwise rotates from the closing position to the position of FIG. 5, by a predetermined angle (e.g., 90°).

Then, the roller 257 contact-pressed by a small radius part of the cam 175 moves to the left as shown in FIG. 5 as elastic energy is discharged due to contraction of the trip spring 195, as the cam 175 installed at the cam shaft 171 counterclockwise rotates by 90°. Therefore, the second link 255 upward moves by a predetermined distance.

The switching rod 112 connected to the second link 255 through the connecting rod 225, upward moves by a predetermined distance. As the movable contact of the contact portion 22-1a inside the vacuum interrupter 22-1 connected to a lower end of the switching rod 112 is separated from the fixed contact, the vacuum interrupter 22-1 is in an open circuit state.

The operation of the earth switch 24 will be explained.

The first lever 27a of the power transmission link mechanism 27 of the earth switch 24 contacts a small-radius part (outer circumferential surface having a small radius) of the cam 175, the first lever 27a does not rotate to maintain a state of FIG. 5.

Accordingly, other parts of the power transmission link mechanism 27 maintain the state of FIG. 5, and the movable blade 24d is in a contacted state to the second fixed contactor 24b as shown in FIG. 5.

Here, current from an electric power source side flows, from the electric power source side connection conductor 23, to the fixed contact of the contact portion 22-1a of the vacuum interrupter 22-1. However, the current does not flow to the movable contact of the contact portion 22-1a, because the contact portion 22-1a of the vacuum interrupter 22-1 is in an open circuit state. Therefore, the electric power source side and the electric load side are in an open circuit state.

Hereinafter, a closing operation (in other words earth closing operation or earth operation) of the earth switch 24 of the switch for a solid insulated switchgear according to an embodiment of the present invention, will be explained with reference to FIGS. 4 to 7.

If the main shaft 151 counterclockwise rotates from the position of FIG. 5 by an earth closing driving force from the common actuator 10, a connecting rod (not shown) downward moves, the connecting rod of which lower end has been connected to an output end of the main shaft 151 (refer to the right end in FIG. 4).

The cam shaft 171 connected to an upper end of the connecting rod counterclockwise rotates from the position of FIG. 5, by a predetermined angle (e.g., 90°).

Then, a roller 27a2 contact-pressed by a large radius part of the cam 175 clockwise rotates as shown in FIG. 4, as the cam 175 installed at the cam shaft 171 clockwise rotates by 90°. Therefore, the first lever 27a clockwise rotates as shown in FIG. 4, centering around the first rotation shaft 27a1.

Then, the first link 27b connected to the first lever 27a moves to the left as shown in FIG. 4, and the second lever 27c connected to the first link 27b clockwise rotates centering around the second rotation shaft 27f.

The second link 27d having one end connected to the second lever 27c upward moves. As a result, the movable blade 24d of which intermediate part has been connected to the second link 27d, counterclockwise rotates centering around the conductive hinge base 24e.

Accordingly, as shown in FIG. 4, a free end opposite to the end of the movable blade 24d, the end supported by the conductive hinge base 24e, corresponds to an earth closing position for contacting the first fixed contactor 24a.

Charging current which may remain on electric load side lines is earthed via the first fixed contactor 24a, an intermediate horizontal frame of the supporting frame 50 of FIG. 1, horizontal and vertical frames connected to the intermediate horizontal frame, and earth lines (not shown), sequentially. Accordingly, an operator who is performing an work to divide electric power lines or like can be protected from an electric shock of high voltage.

The operation of the main circuit switch 22 will be explained.

As the cam 175 of the cam shaft 171 counterclockwise rotates as shown in FIG. 4, the roller 257 contacting a smaller curvature radius of the cam 175 is positioned to the left as shown in FIG. 4. As a result, the second link 255 upward moves by a predetermined distance.

The switching rod 112 connected to the second link 255 through the connecting rod 225 also upward moves by a predetermined distance. And, the movable contact of the contact portion 22-1a inside the vacuum interrupter 22-1 connected to a lower end of the switching rod 112 is separated from the fixed contact. As a result, the vacuum interrupter 22-1 is in an open circuit state.

Hereinafter, an opening operation (earth breaking operation or earth opening operation) of the earth switch 24 of the switch for a solid insulated switchgear according to an embodiment of the present invention, will be explained with reference to FIGS. 4 to 7.

If the main shaft 151 clockwise rotates from the position of FIG. 4 by an earth opening driving force from the common actuator 10, a connecting rod (not shown) downward moves, the connecting rod of which lower end has been connected to an output end of the main shaft 151 (refer to the right end in FIG. 4). The cam shaft 171 connected to an upper end of the connecting rod clockwise rotates from the position of FIG. 4 to the position of FIG. 5, by a predetermined angle (e.g., 90°).

Then, the roller 27a2 contacting a small radius part of the cam 175 counterclockwise rotates, as the cam 175 installed at the cam shaft 171 clockwise rotates by 90°. Therefore, the first lever 27a counterclockwise rotates as shown in FIG. 5, centering around the first rotation shaft 27a1.

Then, the first link 27b connected to the first lever 27a moves to the right as shown in FIG. 5, and the second lever 27c connected to the first link 27b counterclockwise rotates centering around the second rotation shaft 27f.

The second link 27d having one end connected to the second lever 27c downward moves. As a result, the movable blade 24d of which intermediate part has been connected to the second link 27d, clockwise rotates centering around the conductive hinge base 24e.

Accordingly, as shown in FIG. 5, a free end opposite to the end of the movable blade 24d, the end supported by the conductive hinge base 24e, corresponds to an earth breaking position for contacting the second fixed contactor 24b.

The operation of the main circuit switch 22 will be explained.

As the cam 175 of the cam shaft 171 clockwise rotates as shown in FIG. 5, the roller 257 contacting a smaller curvature radius of the cam 175 is positioned to the left as shown in FIG. 5. As a result, the second link 255 upward moves by a predetermined distance.

The switching rod 112 connected to the second link 255 through the connecting rod 225 also upward moves by a predetermined distance. And, the movable contact of the contact portion 22-1a inside the vacuum interrupter 22-1 connected to a lower end of the switching rod 112 is separated from the fixed contact. As a result, the vacuum interrupter 22-1 is in an open circuit state.

As aforementioned, in the switch for a solid insulated switchgear, the first fixed contactor 24a and the second fixed contactor 24b are installed with a sufficient spacing distance (e.g., 200 millimeters) so as to be air-insulated. The earth switch 24 includes the movable blade 24d rotatable to a first position for contacting the first fixed contactor 24a, and a second position for contacting the second fixed contactor 24b. When compared with the conventional art where the earth switch is configured as a vacuum interrupter, in the present invention, an insulation distance between contacts of the earth switch can be sufficiently obtained. This can minimize the occurrence of a ground fault at the earth switch.

The configuration of the semi-conductive coating layer of the switch enclosure 21 according to the present invention will be explained with reference to FIGS. 8 to 10.

Figure 8:
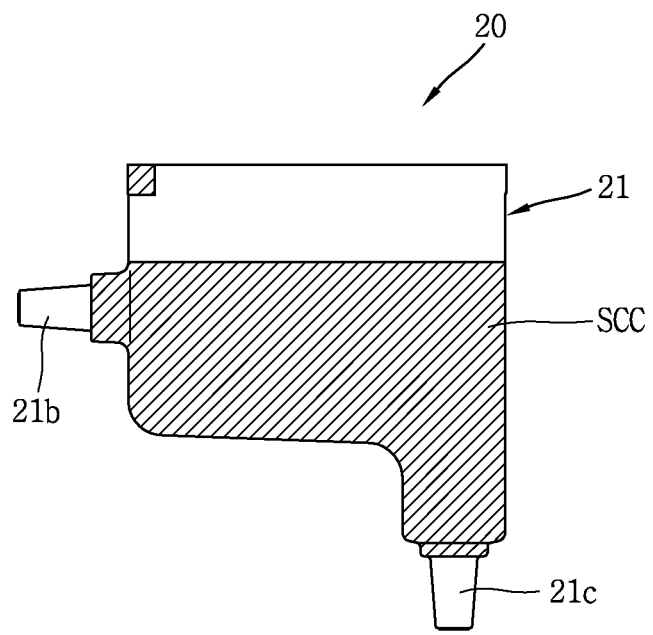
FIG. 8 is a front view showing a configuration of a semi-conductive coating layer of an arc extinguishing unit enclosure according to an embodiment of the present invention.
Figure 9:
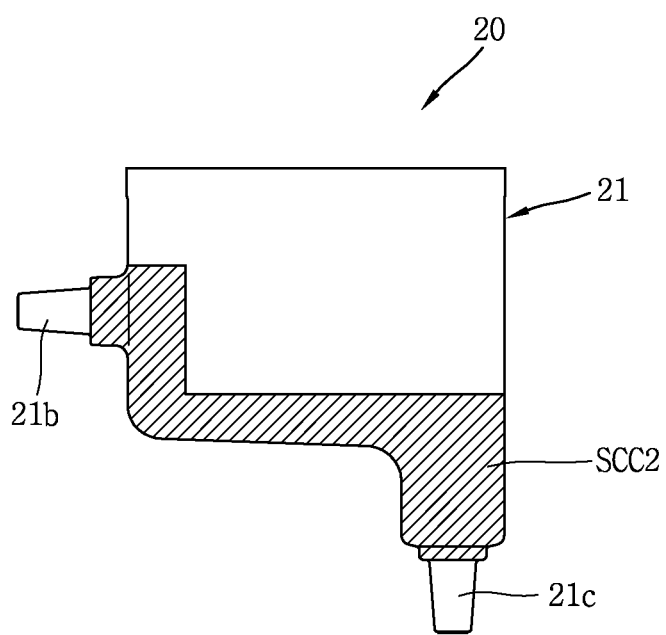
FIG. 9 is a front view showing a configuration of a semi-conductive coating layer of an arc extinguishing unit enclosure according to another embodiment of the present invention.
Figure 10:
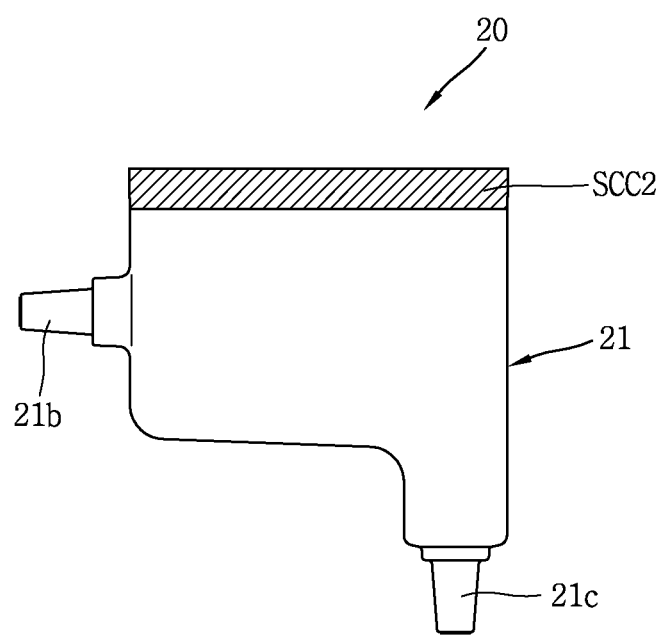
FIG. 10 is a front view showing a configuration of a semi-conductive coating layer of an arc extinguishing unit enclosure according to still another embodiment of the present invention.

Referring to FIGS. 8 to 10, the switch enclosure 21 includes a first external part where the first fixed contactor 24a is installed, and a second external part where the movable blade 24d on the second position is located. The semi-conductive coating layers SCC1, SCC2 and SCC3 are coated to the external part of the switch enclosure 21 including selectively only one of the first external part or the second external part, and are earthed.

As shown in FIG. 8, the semi-conductive coating layer SCC1 according to an embodiment of the present invention, is coated on only a part of the switch enclosure 21 having a height between the electric load side bushing portion 21b and the electric power source side busing portion 21c, except for the first external part of the switch enclosure 21 where the first fixed contactor 24a is installed.

As shown in FIG. 9, the semi-conductive coating layer SCC2 according to another embodiment of the present invention, is coated on only the second external part and a rear base part of the electric load side busing portion 21b, except for the first external part of the switch enclosure where the first fixed contactor 24a is installed.

As shown in FIG. 10, the semi-conductive coating layer SCC3 according to still another embodiment of the present invention, is coated on only a part of the switch enclosure 21 having the same vertical height as the first external part.

As aforementioned, in the switch for a solid insulated switchgear according to the present invention, the first fixed contactor to be earthed, and the second fixed contactor electrically connected to the electric power source side connection conductor are installed with a sufficient spacing distance (e.g., 200 millimeters) so as to be air-insulated. The earth switch includes the movable blade rotatable to a first position for contacting the first fixed contactor, and a second position for contacting the second fixed contactor. When compared with the conventional art where the earth switch is configured by a vacuum interrupter, in the present invention, an insulation distance between contacts of the earth switch can be sufficiently obtained. This can minimize the occurrence of a ground fault at the earth switch.

The switch for a solid insulated switchgear according to the present invention includes the power transmission link mechanism having a plurality of links, and configured to transmit a switching driving force from the common actuator to the movable blade. Under such configuration, a switching driving force from the common actuator which provides a switching driving force of the main circuit switch can be commonly used, without requiring an additional actuator for exclusive use of the earth switch. This can simplify the configuration of the actuator of the switch, and enhance usage efficiency.

In the switch for a solid insulated switchgear according to the present invention, the power transmission link mechanism includes the first lever contactable to the common actuator, and rotatable centering around the first rotation shaft; the first link having one end connected to the first lever, and movable back and forth according to rotation of the first lever; the second lever having one end connected to another end of the first link, and rotatable centering around the second rotation shaft; and the second link having one end connected to the second lever, having another end connected to the movable blade, and up-down movable according to rotation of the second lever. Under such configuration, the first lever rotates by a driving force from the common actuator. As the first lever rotates, the first link moves back and forth. As the first link moves back and forth, the second lever rotates. As the second lever rotates, the second link moves up and down. This can allow the movable blade connected to the second link to move to the first position or the second position.

In the switch for a solid insulated switchgear according to the present invention, the switch enclosure, the main circuit switch and the earth switch are provided in three correspondingly for the 3-phases AC circuit, thereby configuring a single circuit switch. Since the solid insulated switchgear includes four circuit switches, electric power received can be supplied to four branch circuits in a divided manner, or can be broken, or the circuit can be earthed.

The arc extinguishing unit includes an earth switch installed for each pole, the earth switch includes a first fixed contactor and a second fixed contactor in the accommodation body portion of the switch enclosure so as to be air-insulated, and the movable blade rotatable to a first position for contacting the first fixed contactor, and a second position for contacting the second fixed contactor. Under such configuration, a switching insulation distance of the earth switch can be sufficiently obtained.

In the switch or the arc extinguishing unit of the solid insulated switchgear, the semi-conductive coating layer is coated on only one of the first external part of the switch enclosure where the first fixed contactor is installed, and the second external part of the switch enclosure where the movable blade on the second position separated from the first fixed contactor is located. That is, the semi-conductive coating layer is coated on only one external part of a current carrying path. Under such configuration, an electric field can be prevented from being concentrated between the first fixed contactor and the movable blade on the second position inside the switch enclosure. This can minimize the size of the solid insulated switchgear, because the size of the arc extinguishing unit needs not be increased.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A switch for a solid insulated switchgear having a common actuator that provides a driving force for switching a circuit, the switch comprising:
an enclosure that is solid insulated and includes an electric power source side bushing portion for burying an electric power source side connection conductor, an electric load side bushing portion for burying an electric load side connection conductor, and an accommodation body portion having air filled therein;
a main circuit switch installed, for each pole, at the enclosure, connected to the common actuator and the electric power source side connection conductor, and having a vacuum interrupter that switches an electric power circuit between an electric power source and an electric load, by receiving a switching driving force from the common actuator; and
an earth switch installed, for each pole, in the accommodation body portion of the enclosure so as to be air-insulated, and the earth switch including a first fixed contactor to be earthed; a second fixed contactor electrically connected to the electric power source side connection conductor; and a movable blade connected to the common actuator, and movable to a first position for contacting the first fixed contactor and to a second position for contacting the second fixed contactor, by a switching driving force from the common actuator.

2. The switch for a solid insulated switchgear of claim 1, further comprising a power transmission link mechanism connected between the movable blade and the common actuator, and having a plurality of links for transmitting a switching driving force from the common actuator to the movable blade.

3. The switch for a solid insulated switchgear of claim 2, wherein the power transmission link mechanism comprising:
a first lever contactable to the common actuator, and rotatable centering around a first rotation shaft;
a first link having one end connected to the first lever, and movable back and forth according to rotation of the first lever;
a second lever having one end connected to another end of the first link, and rotatable centering around a second rotation shaft; and
a second link having one end connected to the second lever, having another end connected to the movable blade, and up-down movable according to rotation of the second lever.

4. The switch for a solid insulated switchgear of claim 1, further comprising a semi-conductive coating layer coated on only one of a first external part of the enclosure where the first fixed contactor is installed, and a second external part of the enclosure where the movable blade on the second position is located, and the semi-conductive coating layer formed to be earthed.

5. The switch for a solid insulated switchgear of claim 4, wherein the semi-conductive coating layer is coated on only part of the enclosure having a height between the electric load side bushing portion and the electric power source side busing portion, except for the first external part of the enclosure where the first fixed contactor is installed.

6. The switch for a solid insulated switchgear of claim 4, wherein the semi-conductive coating layer is coated on only the second external part and a rear base part of the electric load side busing portion, except for the first external part of the enclosure where the first fixed contactor is installed.

7. The switch for a solid insulated switchgear of claim 4, wherein the semi-conductive coating layer is coated on only part of the enclosure having the same vertical height as the first external part.

8. An arc extinguishing unit for a solid insulated switchgear, comprising:
- an enclosure that is solid insulated and includes an electric power source side bushing portion for burying an electric power source side connection conductor, an electric load side bushing portion for burying an electric load side connection conductor, and an accommodation body portion having air filled therein;
- a main circuit switch installed, for each pole, at the enclosure, and having a vacuum interrupter that switches an electric power circuit between an electric power source and an electric load; and
- an earth switch installed, for each pole, in the accommodation body portion of the enclosure so as to be air-insulated, and the earth switch including a first fixed contactor to be earthed; a second fixed contactor electrically connected to the electric power source side connection conductor; and a movable blade movable to a first position for contacting the first fixed contactor and to a second position for contacting the second fixed contactor.

9. The arc extinguishing unit for a solid insulated switchgear of claim 8, further comprising a semi-conductive coating layer coated on only one of a first external part of the switch enclosure where the first fixed contactor is installed, and a second external part of the switch enclosure where the movable blade on the second position is located, and the semi-conductive coating layer formed to be earthed.

10. The arc extinguishing unit for a solid insulated switchgear of claim 9, wherein the semi-conductive coating layer is coated on only part of the enclosure having a height between the electric load side bushing portion and the electric power source side busing portion, except for the first external part of the enclosure where the first fixed contactor is installed.

* * * * *